Figure 1:
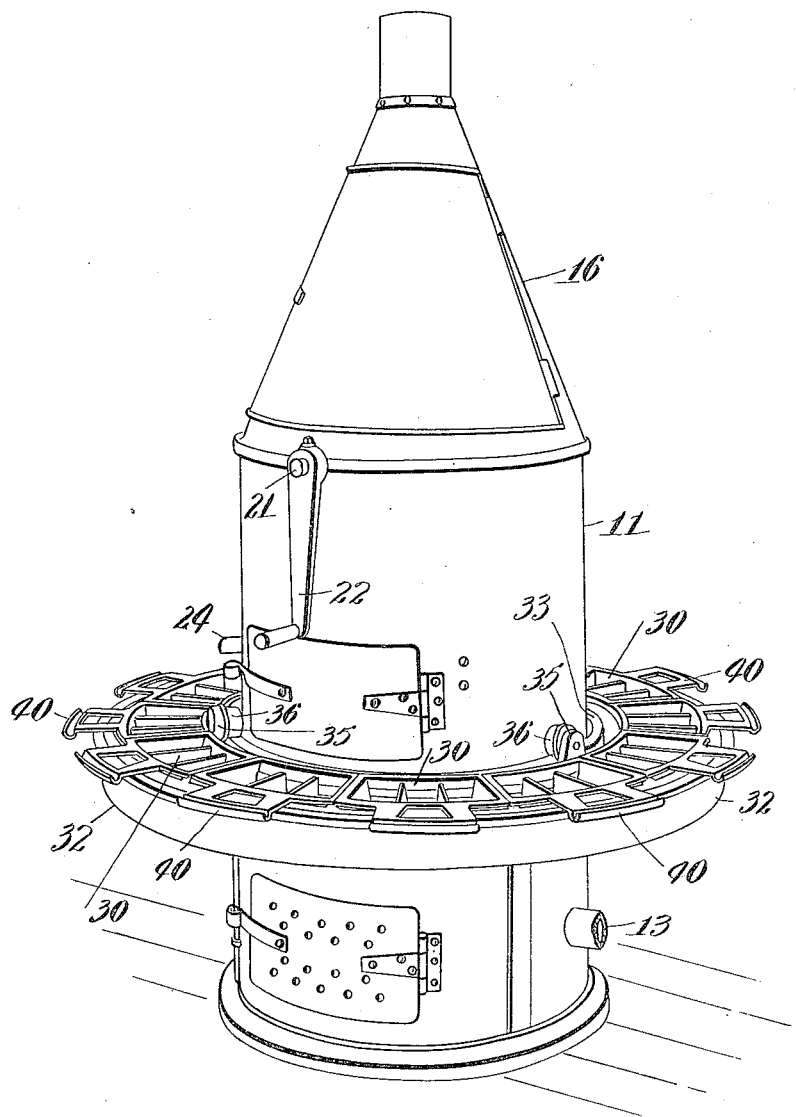

R. T. JOHNSTON.
CASTING FURNACE.
APPLICATION FILED SEPT. 11, 1907.

1,123,883.

Patented Jan. 5, 1915.
2 SHEETS—SHEET 1.

R. T. JOHNSTON.
CASTING FURNACE.
APPLICATION FILED SEPT. 11, 1907.
1,123,883.
Patented Jan. 5, 1915.
2 SHEETS—SHEET 2.
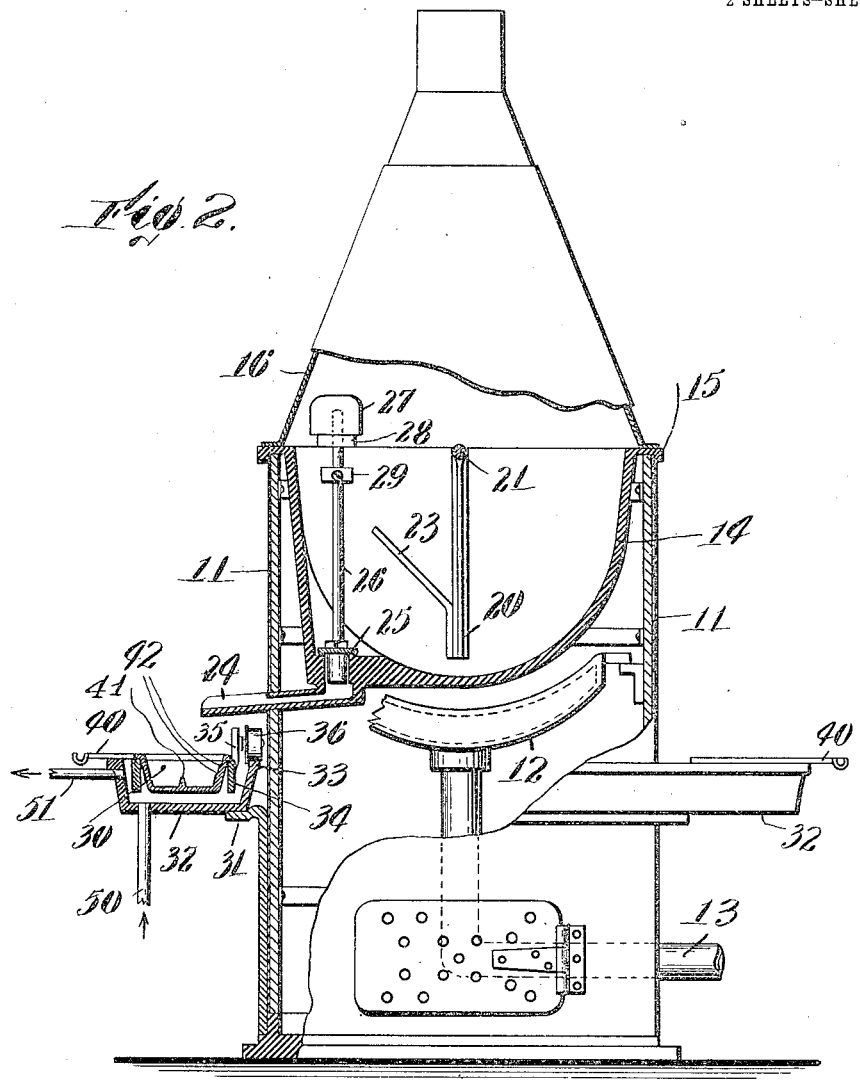
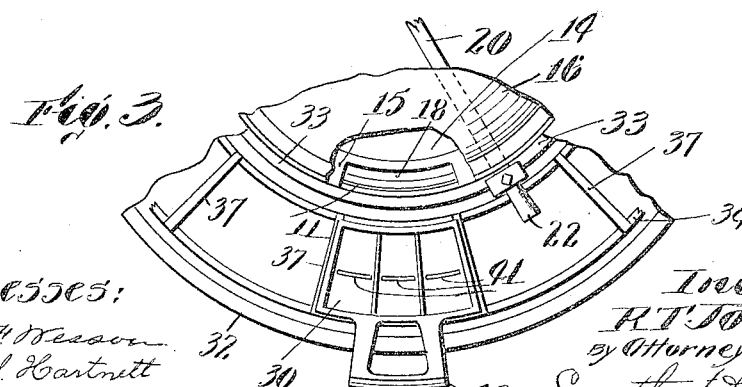

UNITED STATES PATENT OFFICE.

ROBERT T. JOHNSTON, OF SCOTCH PLAINS, NEW JERSEY, ASSIGNOR, BY MESNE ASSIGNMENTS, TO AUTOMATIC FURNACE CO., OF NEW YORK, N. Y., A CORPORATION OF NEW YORK.

CASTING-FURNACE.

1,123,883. Specification of Letters Patent. Patented Jan. 5, 1915.

Application filed September 11, 1907. Serial No. 392,280.

*To all whom it may concern:*

Be it known that I, ROBERT T. JOHNSTON, a citizen of the United States, residing at Scotch Plains, in the county of Union and State of New Jersey, have invented a new and useful Casting-Furnace, of which the following is a specification.

This invention relates to a furnace especially designed for melting and remelting metal to cast it into ingots, and while capable of general use, it is especially designed for producing ingots and pigs for use in slug and type-casting machines, and in type-casting plants in general, either from new metal or from the slugs and types remelted. It is the general practice at present in remelting metal of this kind to stir or mix the metal and ladle the same into molds by hand, the molds and furnace being separate. On account of its slowness, this process consumes considerable labor and fuel, and also the furnace and mold being separate, the apparatus takes up a comparatively large amount of floor space.

The principal objects of the present invention are to provide the usual melting pot or caldron with means whereby it may be connected with the molds directly by a spout, a valve or other means being provided to regulate the flow of metal; to provide means whereby the molds may be located under the spout so as to be moved along and filled one after another; to provide means whereby the molds may be supported by the furnace itself in such position as to surround the same and to move around the furnace in their travel, as described above; to provide a simple and convenient means for moving the molds; to provide for rapidly cooling the molds and the ingots therein after the casting is accomplished; to provide a construction that will allow the molds to remain in water practically all the time; to provide an inlet and outlet for the water that will not require a moving joint, which would have to be packed and kept tight; to provide a single hood for venting the furnace proper and receiving the fumes from the melting-pot; and to provide a combined stirrer and valve operating device whereby the metal can be agitated or mixed without operating the valve, but the valve cannot be opened to discharge the metal without first mixing or stirring the metal.

Further objects and advantages of the invention will appear hereinafter.

Reference is to be had to the accompanying drawings in which—

Figure 1 is a perspective view of a casting furnace constructed in accordance with the principles of this invention. Fig. 2 is a central vertical sectional view of the same showing certain parts in elevation, and Fig. 3 is a plan of a portion of the mold-supporting, carrying, and cooling device, showing a part of the furnace.

The invention is illustrated as embodied in a form in which the furnace proper preferably consists of a metal shell 11 lined with asbestos or the like. The furnace may be designed to operate with any desired kind of fuel, but it is shown as being provided with a gas-burner 12 supplied by a pipe 13 entering the lower portion of the furnace. Any desired kind of burner or other source of fuel may be employed.

Supported at the top of the shell is a caldron or melting pot 14 having a horizontal flange 15 resting on top of the furnace shell 11. On this flange rests a hood 16 which is connected with a flue. It will be seen that the fumes from the molten metal may be discharged directly into the hood and as a part of the flange 15 is omitted or cut away at 18 the products of combustion from the burner are also discharged into this hood. By this construction a simplification is obtained as a single outlet for fumes, products of combustion, etc., both from the melting pot and from the flame is provided for.

When the furnace is designed to remelt metals, as indicated above, it is desirable to provide means for stirring the same, which is shown herein in the form of a stirrer or mixer 20 mounted to swing on end trunnions 21, which do not extend across the melting pot and therefore do not interfere with charging the caldron. One of the trunnions is provided with a handle 22 on the outside of the furnace. The stirrer is preferably of crescent shape, so that it will sweep along substantially the entire bottom of the melting pot. It will be noticed that the stirrer is shown as provided with a projection 23, the purpose of which will now be described.

The melting-pot is provided with a spout 24 through which its contents may be discharged, this being controlled in the present instance by a valve 25 having a valve stem 26 normally held down to its seat by any desired means as a weight 27, the valve-stem being guided by a bracket 28.

For obvious reasons the metal has to be mixed before it is discharged into the molds. It is desirable that means be provided whereby the metal cannot be discharged until it has been so mixed. For this purpose, according to this invention, the stirring device is provided with means whereby, although it may be operated independently, the means for discharging the metal, as for example, the valve 25, cannot be operated except by the operation of said stirring means.

In the present case the valve-stem 26 is provided with a collar or the like 29 adapted to be engaged by the projection 23 when the stirring device is operated to its extreme position in one direction. This not only mixes the metal, but it opens the valve and allows the metal to be discharged through the spout 24 into the molds 30. The upward motion of this collar 29 is limited by the bracket 28, and as the collar is adjustable along the valve stem, its position regulates the distance which the valve can be opened. The molds are supported in the following manner. On the furnace shell are a plurality of outwardly extending brackets 31 constituting a support for an annular stationary tank 32. This tank preferably contains water, and is provided with a ledge 33 on one side also extending along the furnace. With this construction the molds remain in water practically all the time and water can be circulated through the tank through inlets 50 and outlets 51 which, being stationary, do not require packing of joints in order to keep them tight. Within the tank is located a spider 34 which when the furnace is circular will be of similar form, and which corresponds in shape with the tank as it is contained therein. This spider has upwardly projecting arms 35 on which are mounted rollers 36 rolling on the ledge 33, and is of such form as to support the molds 30 and carry them around the furnace.

In order that the spider may be rotated easily by means of the molds themselves, it is provided with cross bars 37 located between the molds so that force applied to any mold will be transmitted to one of these cross bars to move the spider along the tank and around the furnace. It will be noticed that when the tank is filled with water the molds are in the water at all times during pouring as well as while cooling. This is possible in the casting of soft metals and compositions such as used in printing, as such metals do not have the chilling properties of cast iron.

The molds themselves are of such shape as to produce the desired form of ingots and are provided with projections 40 constituting handles by means of which they and the spider may be moved along in the tank and around the furnace. The molds preferably are provided with partitions 41, as is well understood, for the purpose of making indentations in the bottoms of the ingots and dividing the molds into a plurality of spaces for the casting of ingots. Another feature which is shown herein is the provision of the molds with ledges 42 on one side thereof at different levels in order to guide the operator so that he may produce ingots of the desired sizes.

It will be seen that by this construction or any other coming within the scope of the claims, the above mentioned advantages are secured in a simple and convenient manner, and with a construction which is inexpensive and takes up but very little room in practice; the metal can be mixed and the ingots cast by a single operation, and the molds moved along and cooled in a very simple manner, the molds being arranged so that those which have been charged are leaving the filling point as the empty ones are approaching it.

While I have illustrated and described a preferred form of the invention, I am aware that the same may be carried out with many modifications thereof by any person skilled in the art without departing from the scope of the invention as expressed in the claims. Therefore, I do not wish to be limited to the particular form illustrated, but What I do claim is:—

1. The combination with a caldron or melting pot, of means for discharging molten material therefrom, and a stirrer having means for operating said discharging means.

2. The combination with a caldron or melting pot, of means for discharging molten material therefrom, a stirrer in said melting pot, and means operated by the stirrer for operating said discharging means to stop the flow of metal from said melting pot.

3. A melting pot or caldron having means for discharging molten material therefrom, and a stirrer capable of operation independently of said discharging means, said stirrer having means for operating said discharging means.

4. A caldron or melting pot having an outlet, a valve therefor, a stirrer capable of operation independently of said valve, and means connected with the stirrer for operating the valve.

5. The combination with a caldron or melting pot having an outlet, of a valve for said outlet, a stirrer in said melting pot, and means operated by the stirrer for opening said valve.

6. The combination with a caldron or melting pot having an outlet, of a valve therefor, a valve stem for said valve, a collar on the valve stem, and a swinging stirrer having an arm thereon adapted to engage said collar and lift the valve.

7. The combination of a valve for a caldron or melting pot, a valve stem therefor, a collar on the valve, a movable stirrer, and a projection extending angularly from said stirrer and adapted to engage and lift said collar during the motion of the stirrer in one direction.

8. The combination of a valve for a melting pot or caldron, a valve stem therefor, means for holding the valve to its seat, and means for operating said valve comprising a stirrer having a device thereon for lifting the valve.

9. In a furnace, the combination of a casing, a caldron or melting pot therein spaced from said casing, a burner under said melting pot, an outlet from said melting pot extending through the casing, a stirrer in the melting pot, an arm on the outside of said casing connected with the stirrer for operating it and constituting the sole manually operated means for operating said valve, and a hood covering said casing and pot and adapted to receive fumes, products of combustion, and the like from the melting pot and burner.

10. In a furnace, the combination of a casing, a caldron depending from the top thereof having a space between its upper edge and the wall of the casing, a burner located below the melting pot in the casing, and a removable hood over and outside the casing adapted to be connected with a flue and to receive fumes from the melting pot and products of combustion from the burner through said space and to conduct them away.

11. In a furnace, the combination of a casing, a melting pot therein of smaller diameter than the casing and having a flange at its upper edge resting on the casing, said flange being cut away at one side of said melting pot, a burner under the melting pot, and a hood over the top of the casing.

12. The combination of a valve for a melting pot or caldron, a valve stem therefor, a stirrer in the melting pot, an adjustable collar on said valve stem, a stationary guide for the stem constituting a stop for said collar, and means on the stirrer for engaging the collar to operate the valve.

13. In a furnace, the combination of a shell, a burner in said shell, means for supplying said burner with fuel, a melting pot supported by the upper part of the shell over the burner, brackets mounted on said shell, a mold-supporting device carried by said brackets, and means extending from said melting pot through said upper part of the shell for discharging the contents of the pot into molds held by said mold-supporting device.

14. In a furnace, the combination of a shell, a melting pot located in the upper part of said shell, outwardly extending supports fixed around the lower part of the shell, and a mold-supporting device surrounding said shell and mounted on said supports.

15. In a furnace, the combination of a shell having outwardly extending supports near the bottom thereof, a melting pot in the upper part of said shell, and a water holding tank mounted on said supports and surrounding said casing and constituting a mold-supporting device.

16. In a furnace, the combination of a shell having outwardly extending supports thereon, an annular tank adapted to hold water supported by said supports and surrounding the shell, and a spider movably mounted in said tank and adapted to support molds.

17. In a furnace, the combination of a shell having outwardly extending brackets thereon, an annular tank adapted to hold water supported by said brackets and surrounding the shell, a spider movably mounted in said tank and adapted to support molds, said spider having upwardly extending arms on the inner side thereof, and rollers on said arms resting on the inner wall of said tank.

18. The combination of a furnace shell having outwardly extending brackets thereon, an annular tank supported by said brackets and surrounding said shell, a spider of substantially the same shape as said tank located within the tank, said spider having upwardly extending arms, rollers mounted on said arms and supported by said tank, whereby said spider is rotatably mounted in the tank, said spider having cross-bars, and molds located in said spider between the cross-bars.

19. The combination of a furnace, a water tank supported by and surrounding said furnace, a spider located in said water tank, anti-friction devices for supporting the spider and permitting its rotation within the tank, and molds removably mounted in the spider and having projecting arms by which the spider may be rotated.

20. The combination with a water tank, of a spider movably mounted therein provided with cross-bars, and a series of removable molds mounted between said cross-bars projecting down into the water and provided with outwardly extending handles whereby the spider may be moved along in the tank by grasping any one of the handles and turning the spider thereby.

21. The combination of a furnace, a tank surrounding said furnace and supported thereby, and molds movable around the furnace in the tank.

22. The combination of a furnace, a tank surrounding said furnace, and molds movable around the furnace in the tank.

23. The combination with a tank forming a support, of a movable spider therein, and a movable ingot mold supported by said spider, said mold having an outwardly projecting handle by which said mold and spider may be moved on the support and a furnace surrounded by the tank.

24. The combination with a water tank, of a series of individually removable molds located in said tank, each having an outwardly extending handle by any one of which the whole series of molds may be moved along the tank and a furnace surrounded by the tank.

In testimony whereof I have hereunto set my hand, in the presence of two subscribing witnesses.

ROBERT T. JOHNSTON.

Witnesses:
ANNIE B. WALTERS,
ALBERT E. DAVIS.

Copies of this patent may be obtained for five cents each, by addressing the "Commissioner of Patents, Washington, D. C."